United States Patent
Ahn

(10) Patent No.: US 8,850,548 B2
(45) Date of Patent: *Sep. 30, 2014

(54) USER-PORTABLE DEVICE AND METHOD OF USE IN A USER-CENTRIC IDENTITY MANAGEMENT SYSTEM

(75) Inventor: Gail-Joon Ahn, Phoenix, AZ (US)

(73) Assignee: Open Invention Network, LLC, Durham, NC (US)

( * ) Notice: Subject to any disclaimer, the term of this patent is extended or adjusted under 35 U.S.C. 154(b) by 813 days.

This patent is subject to a terminal disclaimer.

(21) Appl. No.: 12/472,512

(22) Filed: May 27, 2009

(65) Prior Publication Data

US 2009/0300747 A1   Dec. 3, 2009

Related U.S. Application Data

(60) Provisional application No. 61/056,249, filed on May 27, 2008.

(51) Int. Cl.
*G06F 21/00* (2013.01)
*G06F 21/34* (2013.01)
*H04L 29/06* (2006.01)
*G06F 21/62* (2013.01)

(52) U.S. Cl.
CPC ............... *G06F 21/34* (2013.01); *H04L 63/20* (2013.01); *H04L 63/08* (2013.01); *H04L 63/102* (2013.01); *G06F 21/6263* (2013.01)
USPC ....... 726/9; 726/8; 726/20; 713/172; 713/185

(58) Field of Classification Search
USPC .......................... 726/1, 8, 9, 20; 713/172, 185
See application file for complete search history.

(56) References Cited

U.S. PATENT DOCUMENTS

| | | | |
|---|---|---|---|
| 4,554,141 A | 11/1985 | Scull et al. | |
| 6,898,711 B1 | 5/2005 | Baumen et al. | |
| 7,020,872 B1 * | 3/2006 | Goire et al. | 717/143 |
| 7,296,149 B2 * | 11/2007 | Hiltgen | 713/161 |
| 7,350,139 B1 | 3/2008 | Siimons | |
| 7,366,918 B2 | 4/2008 | Barlow et al. | |
| 7,395,244 B1 | 7/2008 | Kingsford | |
| 7,451,921 B2 | 11/2008 | Dowling et al. | |
| 7,490,242 B2 | 2/2009 | Torres et al. | |
| 7,523,071 B2 | 4/2009 | Fox et al. | |
| 7,570,943 B2 | 8/2009 | Sorvari et al. | |

(Continued)

OTHER PUBLICATIONS

Ahn, et al., "Managing Privacy Preferences for Federated Identity Management," Nov. 11, 2005, DIM 05, ACM 1-59593-232-01/05/0011, p. 28-36.

*Primary Examiner* — Mohammad A Siddiqi
(74) *Attorney, Agent, or Firm* — Haynes and Boone, LLP

(57) ABSTRACT

A user-portable computing device configured as a smart card enables a user to carry identification information and to generate security tokens for use in authenticating the user to a service provider. The device includes memory for storing user identities as information cards that are exported to a host computer, presented to a user in visual form, and then selected for use in the authentication process. A security token service installed on the device issues a security token in response to a token request sent from the host computer that references the selected user identity. The security token service uses user attribute information stored on the user device to compose the claim assertions needed to issue the security token. The token is returned to the host computer and used to facilitate the authentication process.

19 Claims, 12 Drawing Sheets

(56) References Cited

U.S. PATENT DOCUMENTS

| | | | |
|---|---|---|---|
| 7,617,390 B2 * | 11/2009 | Sharma et al. | 713/1 |
| 7,627,895 B2 * | 12/2009 | Gifford et al. | 726/9 |
| 7,653,602 B2 | 1/2010 | Davis | |
| 7,703,128 B2 | 4/2010 | Cross et al. | |
| 7,779,267 B2 * | 8/2010 | Chen et al. | 713/185 |
| 7,831,522 B1 * | 11/2010 | Satish et al. | 705/76 |
| 8,079,069 B2 * | 12/2011 | Burch et al. | 726/9 |
| 8,087,060 B2 * | 12/2011 | Norman et al. | 726/1 |
| 8,151,324 B2 * | 4/2012 | Burch et al. | 726/4 |
| 2001/0054148 A1 * | 12/2001 | Hoornaert et al. | 713/172 |
| 2002/0062451 A1 | 5/2002 | Scheidt et al. | |
| 2005/0177724 A1 | 8/2005 | Ali et al. | |
| 2006/0156385 A1 | 7/2006 | Chiviendacz et al. | |
| 2006/0179404 A1 | 8/2006 | Yolleck et al. | |
| 2007/0250904 A1 | 10/2007 | Waller | |
| 2008/0178272 A1 * | 7/2008 | Gajjala et al. | 726/6 |
| 2008/0229384 A1 * | 9/2008 | Hodgkinson et al. | 726/1 |
| 2010/0132019 A1 | 5/2010 | Hardt | |

* cited by examiner

| INTERACTION | ENTITY | REQUIRED FUNCTIONS | POSSIBLE TECHNOLOGIES |
|---|---|---|---|
| 1. ACCESS TO RESOURCE<br>2. REQUEST CLAIM | USER (IDENTITY SELECTOR) | - CONNECT THE SP SERVICES | - BROWSER<br>- CLIENT APPLICATION (WEB SERVICE) |
| | | - VERIFYING THE SP : IT IS THE CORRECT SP WHICH USER WANTS TO CONNECT | - CERTIFICATE<br>- SITE KEY |
| | | - UNDERSTANDING THE SP'S REQUEST CLAIMS FOR AUTHENTICATION | - WS-METADATAEXCHANGE |
| | RP | - PROVIDING RP SERVICE TO USER | - WEB SERVICE<br>- WEB SERVER |
| | | - PROVIDING RP'S AUTHENTICATION SPECIFICATION | - WS-SECURITYPOLICY<br>- CLAIM TAGS |
| | | - PROVIDING AUTHENTICATION METHODS | - ID/PASSWORD<br>- KERBEROS<br>- SAML<br>- X.509 |
| | | - PROVIDING FOR CONFIDENTIALITY AND INTEGRITY | - SSL/TLS<br>- XML SIGNATURE<br>- SECURITY KEY/ PUBLIC KEY |
| | | - PROVIDING RP'S CERTIFICATE | - WS-ADDRESSING |
| | | - VERIFYING THE USER MACHINE | - SITE KEY |

FIG. 8A

| INTERACTION | ENTITY | REQUIRED FUNCTIONS | POSSIBLE TECHNOLOGIES |
|---|---|---|---|
| 3. SELECT INFOCARD | USER (IDENTITY SELECTOR) | - INFOCARD MANAGEMENT (CREATE, DELETE, EDIT, IMPORT, EXPORT, AND VIEW) | - IDENTITY SELECTOR |
| | | - VERIFYING THE SP : IT IS THE CORRECT SP WHICH USER WANTS TO CONNECT | - CERTIFICATE |
| | | - FILTERING FUNCTION FOR INFOCARD | - DOM, XML |
| | | - AUDIT: REVIEW THE HISTORY OF CARD USAGE | |
| | USER (IDENTITY SELECTOR) | - CONNECT THE IDP SERVICES | - IDENTITY SELECTOR |
| | | - UNDERSTANDING THE AUTHENTICATION METHOD OF IDP | - WS-METADATAEXCHANGE |
| | | - VERIFYING THE IDP : IT IS THE CORRECT IDP WHICH USER WANTS TO CONNECT | - CERTIFICATE<br>- SITE KEY |
| 4-(1) AUTHENTICATION | | - PROVIDING IDP'S AUTHENTICATION SPECIFICATION | - WS-SECURITYPOLICY |
| | IDP | - PROVIDING FOR CONFIDENTIALITY AND INTEGRITY OF COMMUNICATION DATA | - SSL/TLS<br>- XML SIGNATURE<br>- SECURITY KEY/ PUBLIC KEY |
| | | - PROVIDING IDP'S CERTIFICATE | - WS-ADDRESSING |
| | | - PROVIDING AUTHENTICATION METHODS | - ID/PASSWORD<br>- KERBEROS<br>- SAML<br>- X.509 |

FIG. 8B

| INTERACTION | ENTITY | REQUIRED FUNCTIONS | POSSIBLE TECHNOLOGIES |
|---|---|---|---|
| | USER (IDENTITY SELECTOR) | - CONNECT THE IDP SERVICES | - IDENTITY SELECTOR<br>- BROWSER<br>- CLIENT APPLICATION |
| 5-(1) REQUEST A TOKEN<br>6-(1) ISSUE A TOKEN | | - VERIFYING THE IDP : IT IS THE CORRECT IDP WHICH USER WANTS TO CONNECT | - CERTIFICATE<br>- SITE KEY |
| | | - REQUEST/RECEIVE A TOKEN | - WS-TRUST |
| | IDP | - PROVIDING STS SERVICE | - WS-TRUST |
| | | - PROVIDING FOR CONFIDENTIALITY AND INTEGRITY | - SSL/TLS<br>- XML SIGNATURE<br>- SECURITY KEY / PUBLIC KEY |
| | USER (IDENTITY SELECTOR) | REQUEST USER CONSENT TO SUBMIT A TOKEN TO RP | - IDENTITY SELECTOR |
| 7 SUBMIT A TOKEN | | - SUBMIT A TOKEN | - SAML |
| | RP | - VERIFICATION FUNCTION FOR A TOKEN | XML SIGNATURE |
| | | - PROVIDING FOR CONFIDENTIALITY AND INTEGRITY | - SSL/TLS<br>- XML SIGNATURE<br>- SECURITY KEY / PUBLIC KEY |

FIG. 8C

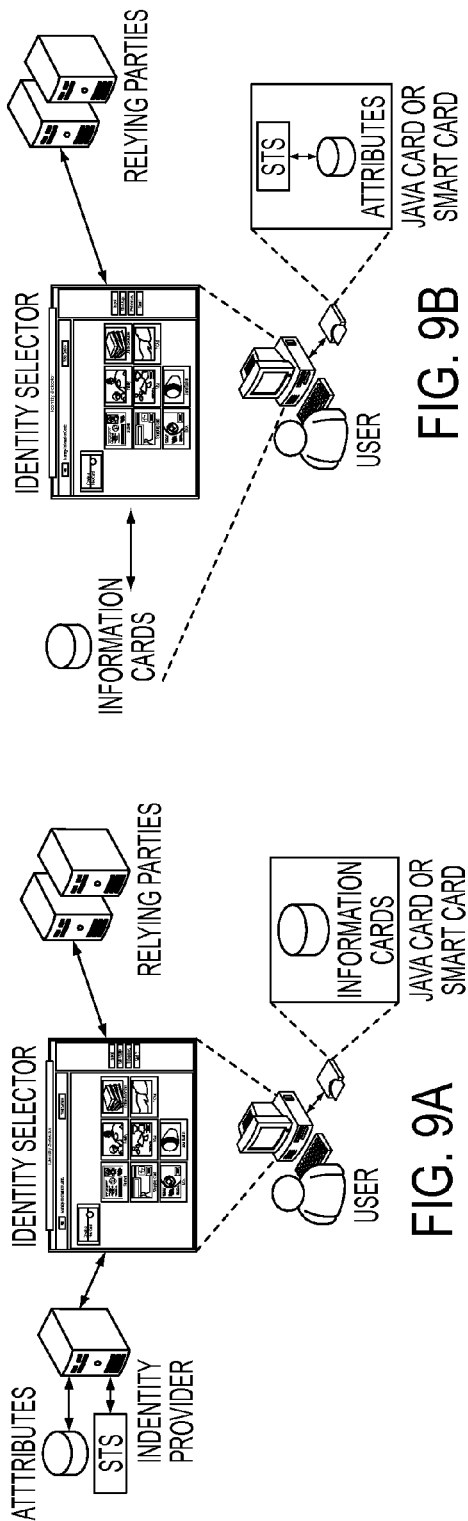
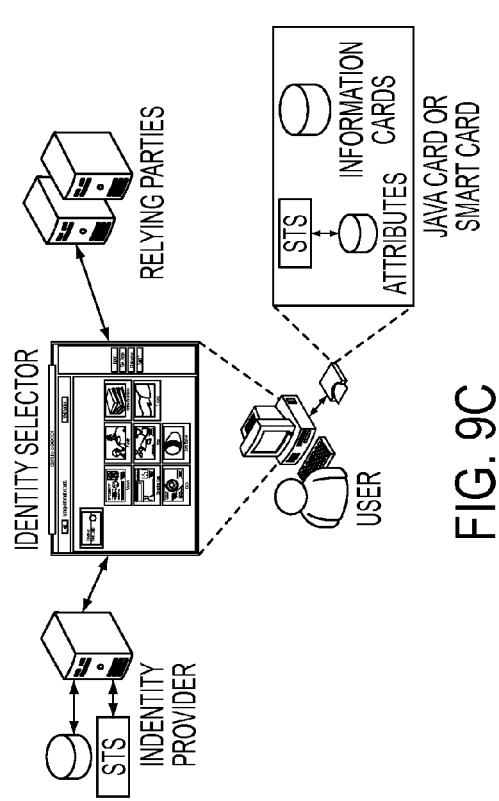
FIG. 9A
FIG. 9B
FIG. 9C

USER-PORTABLE DEVICE AND METHOD OF USE IN A USER-CENTRIC IDENTITY MANAGEMENT SYSTEM

CROSS-REFERENCE TO RELATED APPLICATIONS

This application claims the benefit of prior filed U.S. Provisional Application Ser. No. 61/056,249, filed May 27, 2008, incorporated herein by reference thereto, and relates to U.S. Provisional Application Ser. No. 60/947,708, incorporated herein by reference thereto.

BACKGROUND OF THE INVENTION

1. Field of the Invention

The present invention relates to an identity management system for use in facilitating online interactions, and, more particularly, to a user-portable device suitable for use in establishing compliance with the identity requirements of a service provider in furtherance of facilitating user authentication.

2. Description of the Related Art

The Internet has dramatically changed the way people communicate and do business around the world. Businesses heavily depend on the Internet to draw in commerce and make information available on demand. Managing bank accounts, paying bills and purchasing goods via the Internet are commonly exercised. As the diverse Internet services are continuously introduced, consequently the identity related problems such as identity theft, fraud, and privacy concerns have rapidly been increased. Moreover, tremendous amounts of personal data collected via the Internet have raised a variety of privacy related concerns.

Numerous identity management systems have been introduced to solve the identity management problems of business domains. Each identity management system has its pros and cons and has been deployed in different contexts. However, most identity management systems were designed mainly from the business' perspective. Users were not considered carefully in the design stage of identity management systems and so this has led to serious identity related problems. In addition, there is the limitation to support interoperability between different identity management systems.

Most identity management systems have focused on identity management issues in an isolated domain, and federation issues between identity management systems in the circles of trust. Interoperability between heterogeneous identity management systems was not considered. The identity industry recognizes that identity management systems are designed without the consideration of user experience. Hence, the non-interoperability between current identity management systems currently restricts the growth of e-commerce activities.

As a result, user-centric identity management has recently received significant attention for handling private and critical identity attributes. The main idea of user-centric identity management is to put the users in control of their identity information. Users are allowed to select their credentials when they respond to an authentication or attribute requester. As users control and manage their identity attributes through the user-centric identity management, the users can have more right and responsibility for their identity information than before.

Currently, there are several identity management systems available such as OpenID, LID, and Sxip, which are URL-based identity managements systems; and Microsoft Card-Space, which is an implementation of Identity Metasystem, supporting a claim-based digital identity management.

Digital identity management consists of several tasks such as maintaining the subsets of user's attributes and using these subsets of attributes to enable secure online interactions between users or between users and systems. Digital identity management enables the addition, utilization, and deletion of identity attributes. Identity management systems can be categorized into three basic models: isolated identity management, centralized identity management, and distributed identity management.

The isolated identity management model has its own identity management domain and its own way of maintaining the identities of users including employees, customers, and partners. The centralized identity management model has a single identity provider that brokers trust to other participating members or service providers in a circle of trust. The distributed identity management model provides a frictionless identity management solution by forming a federation and making authentication a distributed task. Every member agrees to trust user identities vouched for by other members of the federation.

These identity management models are mostly focused on a domain centric approach. In the domain centric approach, identity management systems are designed to be cost effective and scalable from the perspective of the enterprise systems. However, most such identity management systems typically neglect user-friendliness and usability issues. Consequently, this deficit leads users to be regarded as the weakest point of security in digital identity management systems, and leaves systems vulnerable to problems such as identity theft, fraud, and privacy concerns.

One approach to overcoming this weakness involves a user-centric identity management strategy. This approach puts the owner of the identity information into the transaction. Several requirements from the user's perspective need to be accommodated in the design of user-centric identity management systems, as compared to the specifications attending a domain centric approach.

Under domain centric identity management systems, the user's information is collected and managed by the service providers, making it difficult for the users to manage their identity information located at the service provider side. Moreover, monitoring the usage of user's private information is difficult for the user to conduct. Furthermore, the usage of a user's private information by service providers creates privacy concern problems. Therefore, the rights and responsibilities of managing the user's identity information should be given to the users, who are the owners of identity information. As the users have more rights on their own identity information, they can decide what information they want to share, how much information to be disclosed with other trusted service providers, and under what circumstances. Accordingly, enhanced protection of the user's private information is enabled by the user.

Most domain centric identity management systems focus on the user authentication to protect their properties from malicious users. However, the authentication of service providers is equally important for a user to determine the trustworthiness of the service providers. Current browsers provide the padlock icon to give notice to the users for the SSL communication between the users and service providers, but it is not enough for the users to determine the trustworthiness of the service providers, since a malicious server can manipulate the SSL and certificate signals in many browser configurations.

By providing the identity information of service providers clearly to the users in web-based interactions, the users are able to distinguish trusted service providers from malicious service providers. The users can then decide to disclose their information to trusted service providers. Hence, the users can protect their information from phishing attacks and possible frauds.

In the current Internet environments, a user has to create a separate account for each web site the user wishes to access. The user also has to maintain multiple separate accounts, which can be a tedious job. In addition, the users often choose insecure passwords, rarely change their passwords, and use the same password across different accounts. These trends make the password-based authentication systems insecure. Better authentication methods are required to overcome the security problems of the password-based authentication method. Such new methods should be easy for the users to use and manage their digital identities.

Additionally, existing identity management systems provide different user experiences and user interfaces that could lead the users to conduct improper interactions with different entities in the Internet environments. Under a user-centric identity management system, the users have to manage their identity information directly, so proper interface and consistent user experience are very important for the users to control their identity information legitimately.

The Identity Metasystem is an interoperable architecture for performing digital identity management. The architecture of Identity Metasystem is defined based on the "Laws of Identity," which codify a set of fundamental principles to which any universally adopted, sustainable identity architecture must conform.

The Identity Metasystem provides interoperability between existing and future identity systems using Web Services (WS-*) protocols, which are a set of specifications built on the web service platform. Specifically, WS-Trust, an encapsulating protocol, is used for claim transformation. WS-MetadataExchange and WS-SecurityPolicy are used to conduct the format and claim negotiations between participants. Finally, WS-Security is used to secure the message. The Identity Metasystem can transform the claims of one type into the claims of another type. WS-* protocols negotiate the acceptable claim type between two parties to provide interoperability between them. The Identity Metasystem also provides a consistent and straightforward user interface to all the users.

There are three roles within the identity metasystem: Identity Providers, who issue digital identities; Relying Parties, who require identities; and Subjects, who are individuals and other entities about whom claims are made. To build an identity metasystem, the system is required to follow five key components: (1) a way to represent identities using claims; (2) a means for identity providers, relying parties, and subjects to negotiate; (3) an encapsulating protocol to obtain claims and requirements; (4) a means to bridge technology and organizational boundaries using claims transformation; and (5) a consistent user experience across multiple contexts, technologies, and operators.

CardSpace, as a Microsoft™ implementation of the Identity Metasystem, provides the consistent user experience required by the Identity Metasystem. When a user needs to authenticate to a relying party, CardSpace interprets the security policy of the relying party and displays and Identity Selector with a set of information cards which satisfy the requested claims in the relying party's security policy. Once the user selects a card, CardSpace contacts the relevant identity provider and requests a security token. The identity provider generates a signed and encrypted security token which includes the required information and returns it to the Identity Selector. The user then decides whether to release this information to the relying party. If the user approves, then the token is sent to the relying party where the token is processed and the user is authenticated.

User-centric identity management has received attention for handling private and critical identity attributes. It allows users to control their own digital identities. Current user-centric identity management approaches, however, are mainly focused on interoperable architectures between existing identity management systems. Typically, internet users can access the Internet from various places such as home, office, school or public internet cafe. There is a need to address portability of a user's digital identity in the user-centric identity management practices. What is needed is a way for users to be able to export their digital identities and transfer them to various computers in a secure manner.

SUMMARY OF THE INVENTION

According to the present invention, a system, method, and computer-readable medium are provided that implement the functionality of a portable user device configured to provide a portfolio of user identities for selection by a user and to issue a security token relative to the selected identity.

According to one embodiment, a system comprises a user-portable user computing device and a security token generator. The user computing device includes a storage comprising a plurality of first user identities, and a storage comprising at least one user attribute. The security token generator is operatively coupled to the user attribute storage. The security token generator is configured to receive a token request in reference to a first user identity and to generate a security token in accordance with the token request, using the at least one user attribute.

According to another embodiment, a method is practiced in an environment including a service provider environment, an identity provider environment, a host computing system, a network connecting the host computing system to the service provider environment and the identity provider environment, and a user-portable user computing device configured to communicate with the host computing system and including a plurality of first user identities and at least one user attribute.

The method includes the host computing system generating a token request in reference to a first user identity; the user computing device receiving the token request; and the user computing device issuing a security token according to the token request, using the at least one user attribute.

According to another embodiment, there is provided a computer-readable medium having computer-executable instructions for execution by a processor, that, when executed, cause the processor to: receive a token request in reference to one of a plurality of user identities that are located on the medium; and generate a security token in accordance with the token request.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 8A-C show a series of tables describing the specifications of the interaction shown in FIGS. 6-7;

FIGS. 9A-C show different models for arranging the security token service and information cards, with FIG. 9C adopted by the invention and compared to FIGS. 9A-B.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
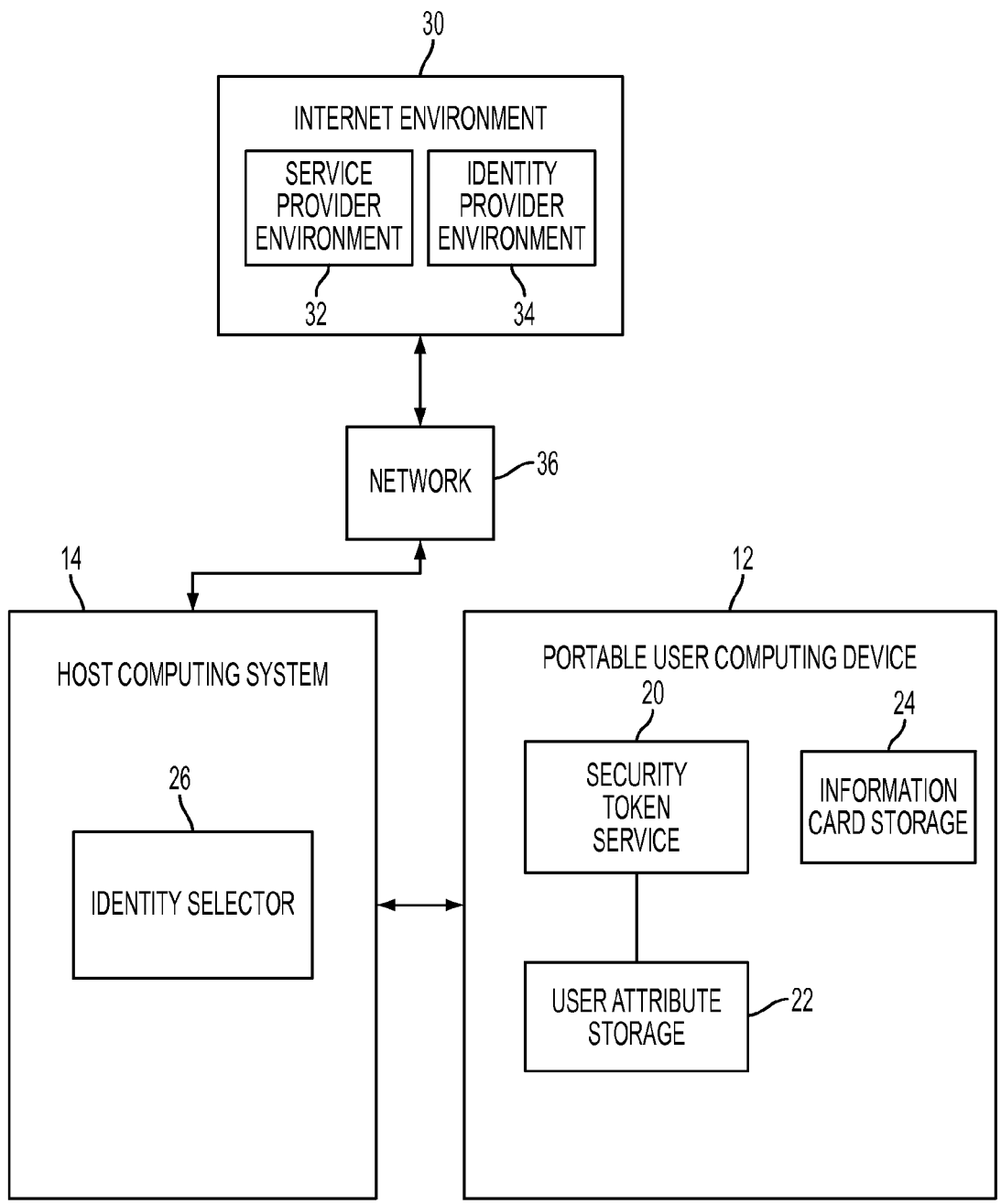
FIG. 1 is a block diagram illustration of a user-centric identity management system, according to one embodiment of the invention.

Referring to FIG. 1, a system 10 features a portable user-centric identity management capability enabling an internet user to personally direct and control the disclosure of user identity information, according to one embodiment of the invention. The user management of all identity-related disclosures finds particular benefit in online interactions between a user and a service provider environment, which require the presentation of specific user-identity information mandated by the service provider before resource access is permitted. For example, according to system 10, the user is able to control the composition and disclosure of a security token required by the security policy of a service provider, and so can facilitate user authentication and subsequent access authorization.

According to the invention, system 10 includes a user-portable user computing device 12 and a host computing system 14. The user device 12 includes a token generator 20 provided in one form as a security token service (STS); a user attribute storage 22 accessible by the STS 20; and a user identity database 24 provided in one form as an information card storage. The host 14 is any user-interactive computing platform that enables a user to access a service provider network such as the internet. The host 14 includes an identity selector 26 that is configured in one form as a client application or service program suitable for managing the identity requirements of online interactions between the user and the internet. For example, such management can include requesting and presenting a security token to a relying party (i.e., service provider) to facilitate compliance with a security policy promulgated by the relying party within the context of an online interaction (i.e., a user request for service).

The combination of host 14 and user device 12 operates within an internet environment 30 having a service provider or relying party environment 32 and an identity provider environment 34. A network 36 such as the internet or web connects host 14 to the internet environment 30. The host 14 is adapted for interoperability with user device 12.

Referring again to FIG. 1, and more specifically to user-portable device 12, the user device 12 serves as a single platform for co-locating essential components of any identity management system: a portfolio of user identities, a security token service, and a database of user attributes. The compilation of user identities is presentable to the user for selection to fit a certain context (i.e., choosing the proper user identity for enabling authentication with a specific service provider). The facility for generating a security token facilitates compliance with the identity requirements of a security policy governing an online interaction. The user attributes are needed by the security token generator to formulate the proper claims concerning an identity.

User device 12 integrates these features into a single shared platform. The information card storage 24 provides the user identities. The STS 20, in combination with user attribute storage 22, issues the security token in reference to one of the user identities represented in information card storage 24. According to the invention, the information card storage, the security token service, and the user attribute storage used by the security token service share a common platform.

Briefly, in operation, the user device 12 receives a token request from host 14 in reference to one of the user identities stored in information card storage 24. In turn, STS 20 issues a security token based on the token request, using the appropriate data from user attribute storage 22. For example, STS 20 retrieves from user attribute storage 22 the appropriate set of user attributes needed to compose the claims relating to the specific user identity referenced by the token request. The security token issued by STS 20 is sent to the identity selector 26 of host 14, and then presented to the relying party that required the security token. This is done in order to comply with the security policy, in furtherance of user authentication, and, ultimately, service authorization.

Referring to information card storage 24, the user identities are digitally represented in the form of information cards. In general, users of Identity Metasystem, supported by the invention, can manage their identities using visual information cards in the Identity Selector. The Information Cards are personal digital identities that users can use online. Visually, each Information Card has a card-shaped picture and a card name associated with it. The information card storage 24 stores a digital representation of these information cards. The use of information cards enables users to organize their digital identities in one place—information card storage 24—and to easily select a user identity they want to use for any given interaction. For example, Identity Selector 26 imports the information cards from user device 12 and displays them at host 14 for examination and selection by the user.

The information cards provided by user device 12 can include any type of information card, such as a self-issued card and a managed card. The user device 12 is particularly useful when it carries multiple managed cards, stored in information card storage 24. Each managed card is generated by an identity provider. Any conventional technique known to those skilled in the art can be used to install managed cards in information card storage 24.

As discussed further, the identity selector 26 is able to retrieve the information cards from user device 12 and present them to the user in visual form. Using the visual information card, the users can select their identity cards with the same experience as the one in real life, e.g., retrieving an identity from a wallet. Each information card represents the user's identity in different contexts and contains references to different subsets of user attributes. In particular, each card mainly includes meta information that would be required to acquire the real attributes, which typically would be obtained from the identity provider in a request security token transaction. However, according to the invention, the user device stores the user attributes, and so there is no need to contact the identity provider. The user device is alone capable of issuing the security token without the intervention of an identity provider, since the required information to support the claim assertions of the security token is located on the user device 12 in user attribute storage 22. The meta information typically includes the necessary user attribute fields, identity provider contact information, and token information.

Referring now to the combination of STS 20 and user attribute storage 22, these components enable user device 12 to issue a security token in response to a token request received from host 14. The STS 20 can be implemented in any suitable form well known to those skilled in the art. For example, STS 20 can be configured to issue security tokens such as a SAML assertion. Any form of security token generator can be used. The user attribute storage 22 contains all of the user attributes needed to formulate the entire universe of claims encompassed by the range of user identities stored in information card storage 24.

In effect, the user device 12—by way of the combination of STS 20 and user attribute storage 22—functions as a portable identity provider. The entire facility for issuing a security token, needed to comply with the security policy of a relying party, is installed on user device 12. By comparison, in conventional identity management systems, the token request generated at a user client machine typically must be forwarded to the identity provider that issued the managed card to which the token request pertains. The identity provider retains all of the personal identifying information needed to compose the claims, and so is the only party fit to issue the proper security token.

The invention avoids any need to communicate with an identity provider in furtherance of issuing a security token. The user attribute storage 22 provides all of the information needed to compose the claim assertions in fulfillment of a token request relating to any of the user identities specified in information card storage 24. Accordingly, the STS 20 can issue the security token simply by reference to user attribute storage 22.

With the invention, there is no need for any local storage of user identities (information cards) on the local client machine. The user device 12 carries all of the user identities in information card storage 24. This feature enables the user to access the internet, and address any authentication requirements, from any machine or terminal, provided the user has the user device 12 and the access terminal is compatible with the specifications and protocols of the user device 12. Further, there is no need to communicate with an identity provider in order to request a security token during an authentication session. Rather, on the same platform that houses the information cards, a self-contained and stand-alone facility is provided to issue security tokens, i.e., STS 20. Indeed, since the user device 12 provides all of the personal data to support the claim assertions—in the form of user attribute storage 22—the STS 20 installed on user device 12 can process the token request and issue the corresponding security token entirely within the environment of user device 12.

In various forms, the user device 12 can be regarded as a personal security device (PSD), a peripheral, an external device, a plug-in, a pervasive device, and a mobile device. The user device 12 features a discrete, stand-alone, common platform combining the functionality of furnishing user identities in the form of information cards, and issuing security tokens in a manner totally localized to the computing environment of user device 12. In one form, user device 12 is implemented as a smart card, and, particularly, as a Java Card. In one configuration, the Java Card is a Java-powered iButton, preferably conforming to Microsoft Infocard specifications. Other portable configurations include the Axalto—.NET-based Smart Card and Memory Experts—ClipDriveBio.

One purpose of the portable user device, and specifically the portable STS, is the convenience offered to the user to carry their digital identity in a secured hardware device. The Smart Card/iButton can act as a secured user credential for user authentication to a service provider; a secured storage for Infocards; and a portable STS in Identity Metasystem. The Java-powered iButton, in one form, has a 16 mm computer chip; supports validated crypto mechanism including public key security; and offers convenient, wearable, and portable features.

The user device 12 is removably connected to host 14. At the host site, the user accesses the internet environment, for example, by contacting a website and requesting access to a web resource (i.e., requesting the performance of a web service). This online interaction typically first requires user authentication before the website (relying party) can proceed with authorizing the resource access. The identity selector is invoked at this juncture to generally manage the identity requirements specified by the relying party in a security policy, for example.

According to the invention, the identity selector 26 of host 12 is adapted to interoperate and otherwise interact with user device 12 to facilitate compliance with the identity requirements of the security policy. In one form, identity selector 26 is a Java-based implementation of Identity Metasystem that is adapted to support the portability-enhanced Identity Metasystem model employed by the invention, namely, the use of portable user device 12 to carry user information cards and to operate in a standalone mode to issue security tokens relative to any of the user identities reflected in the information cards. In another form, the identity selector 26 is Windows™ CardSpace-compatible.

Figure 2:
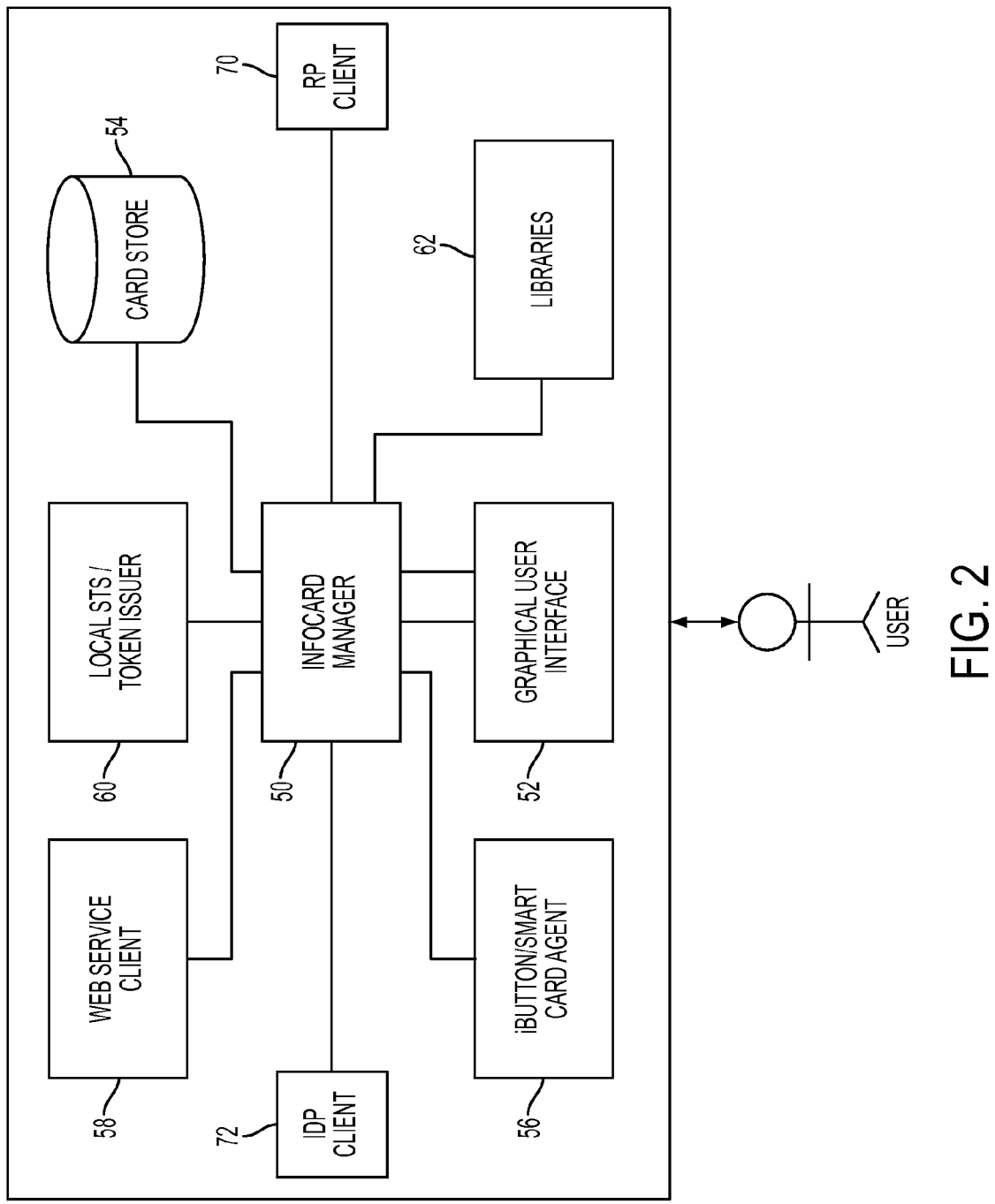
FIG. 2 is a block diagram illustration of the identity selector shown in FIG. 1.

Referring again to FIG. 1, and also to FIG. 2, identity selector 26 provides a functionality to manage the identity requirements for all online interactions between the user, acting via host 14, and the service provider environment 32. FIG. 2 is a block diagram illustration of identity selector 26.

Referring to FIG. 2, identity selector 26 includes an information card manager 50, graphical user interface (GUI) 52, card store 54, iButton/Smartcard Agent 56, web service client 58, local STS/Token Issuer 60, and libraries 62. As shown, the manager 50 is connected as needed to exemplary relying party clients (RP Client) 70 and identity provider clients (IDP Client) 72 in the relying party environment 32 and identity provider environment 34, respectively, of FIG. 1.

The manager 50 handles all events generated by the users and host system 14, and performs the appropriate action. Manager 50 generally directs, supervises, controls, and otherwise manages the various components of identity selector 26. It also provides the card creation and editing functions for the self-issued information card, and handles the import/export function for the information cards stored on user device 12. In particular, manager 50 enables a user to create self-issued information cards that can be stored in card store 54. Manager 50 also manages the transactions with user device 12 for retrieving the information cards stored in information card storage 24.

The graphical user interface 52 manages the user interface of identity selector 26, and can be provided in any conventional form. GUI 52 includes a set of interactive screens that enable the user to create a new card (self-issued card), examine information cards (i.e., to ascertain what information would be disclosed by the release of a security token based on the information card), and select an information card that serves as the basis for preparing a token request in view of directing user device 12 to issue a security token. In one enhancement, the user interface can implement Iframe technology provided by IBM, an application window architecture that allows custom Java GUI.

The card store 54 provides storage for information cards, which may be stored in XML format or any other suitable format. Any type of information card can be stored in card store 54, including self-issued cards and third-party managed cards. The libraries 62 include the required standard and customized modules that are necessary for supporting the functionalities of identity selector 26. The security modules of the identity selector are capable of exchanging security tokens with InfoCard enabled sites, and feature password based security for Infocard storage and support for SAML 1.0, SAML Signatures, and SAML token encryption.

The web-service client 58 support the communication between host system 14 (via the identity selector 26) and the internet environment, signified by exemplary relying party client 70 and identity provider client 72. The web-service client 58 generally supports and otherwise enables the online interaction between host system 14 and the relevant internet environment, and can support all forms of messages and communications.

The iButton/Smartcard agent 56 manages the communication between the identity selector 26 and the Java-powered iButton, namely, portable user device 12. According to one transaction protocol, agent 56 sends the PIN number and token request message to iButton, and receives the issued token from iButton. In one form, the iButton/Smartcard agent 56 and the Java-powered iButton 12 exchange messages using the APDU (Application Protocol Data Unit). The Java-powered iButton 12, in one form, includes a Java applet that implements the STS module 20, user attribute storage 22, and information card storage 24.

The Local STS/Token Issuer 60 generates CardSpace compatible security tokens for any self-issued information card. Additionally, component 60 transforms the token issued from iButton to the CardSpace compatible security token, as needed. In one configuration, component 60 uses openSAML 1.1 and Bouncy Castle API to encrypt and sign the XML token. However, other configurations are possible as known to those skilled in the art.

The Identity Selector may be regarded as a platform service for user-centric identity management. The identity selector provides a consistent user experience for authentication (and in some cases other kinds of interactions) with a Relying Party (e.g., a Service Provider). It provides a user interface that displays a set of Information Card icons from which the user selects their preferred Information Card when authentication is required by a local application or Relying Party (e.g. a web site's login page). It provides a user interface to create and manage personal (i.e., self-issued) Information Cards. It provides a local Security Token Service that is used to issue the security tokens for such self-issued Information Cards. It provides a user interface to import and export Information Cards in standard file formats. And, it is invoked by a browser extension or by a local rich client application. The Identity Selector allows the user to manage (e.g. create, review, update, and delete cards within) their portfolio of Information Cards.

Figure 3:
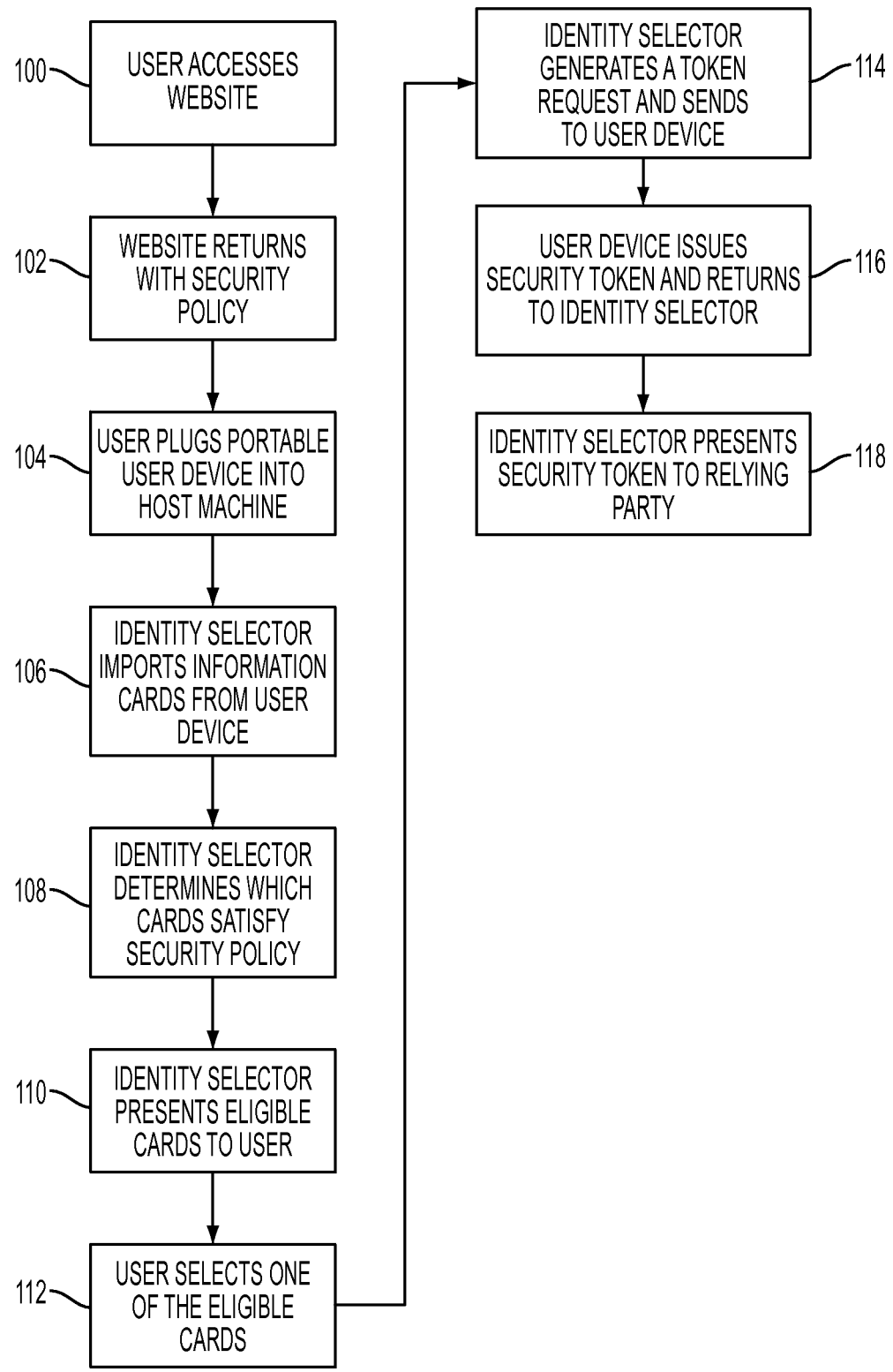
FIG. 3 is a flow diagram illustrating the sequence of operations undertaken in the system of FIG. 1 to facilitate compliance with a security policy promulgated by a service provider.
Figure 4:
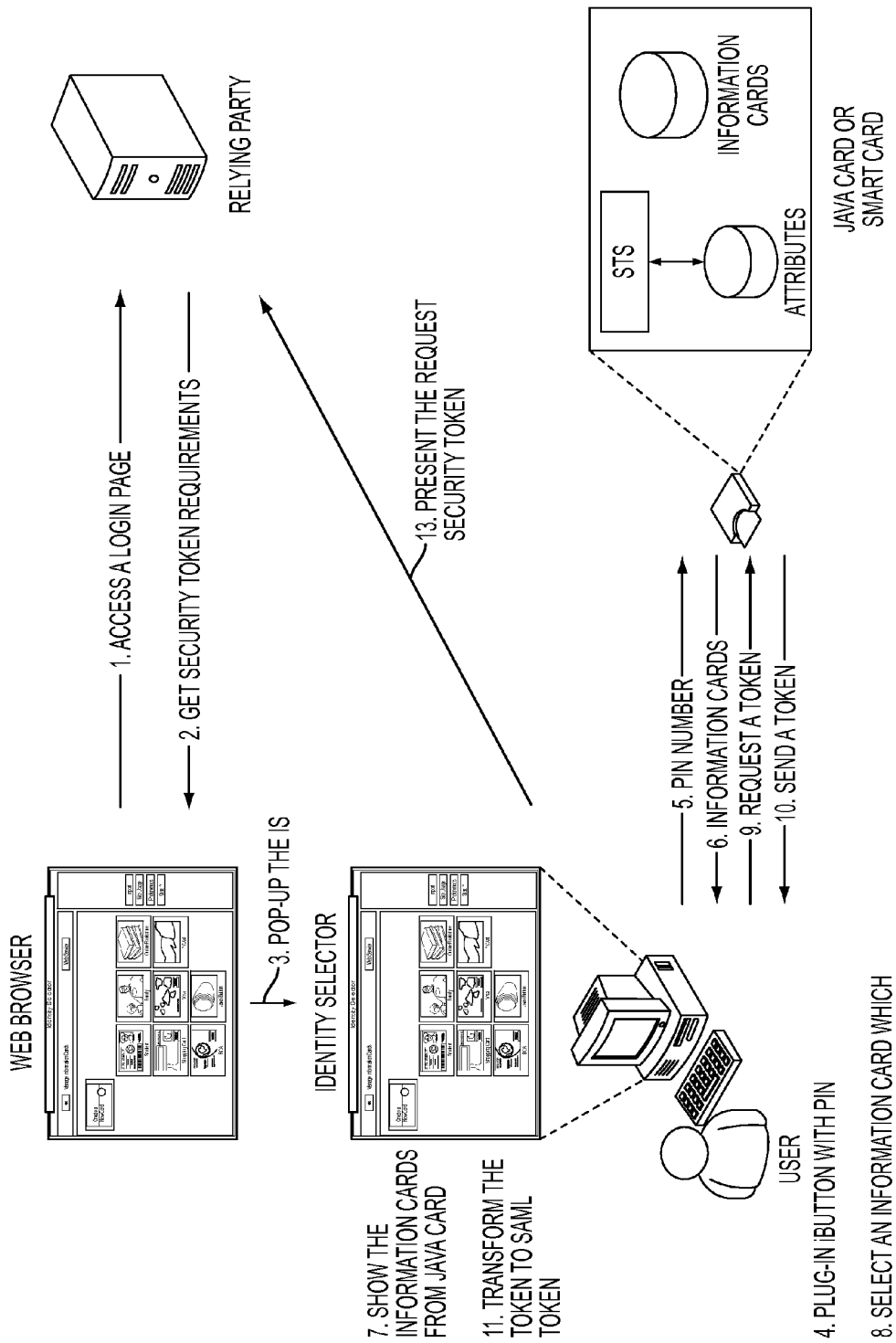
FIG. 4 is a pictorial block diagram illustration of the operating environment showing the flow of messages for the operations set forth in FIG. 3.

Referring to FIG. 3, there is shown a flow diagram illustrating the operations employed by the system of FIG. 1 to facilitate an online interaction between the user and the service provider environment, and, in particular, to achieve compliance with a security policy sent by a relying party according to an authentication process. FIG. 4 is a pictorial representation of an operational state of FIG. 1, showing the flow and structure of messages attending the operations in FIG. 3.

The process begins when a user at host system 14 requests access to a web service or resource via a browser; for example, by accessing a login page at a relying party's web site (step 100). In reply, the website sends a login form to the browser. The login form contains a specific OBJECT tag that includes the site's security policy (step 102). As well known, the security policy governs the authentication process and specifies the identity requirements required by the relying party to first authenticate the user's identity and then to authorize access. The security policy indicates, for example, the identity requirements for a security token.

Receipt of the security policy, via the login form, invokes the identity selector 26. At this point, the identity selector determines which information cards within its domain of operation satisfy the identity requirements of the security policy. This filtering task can take place under several scenarios; namely, the filter may consult with different portfolios of information cards depending upon various factors. For example, if the user is at a local machine, it is likely that the installed version of the identity selector will be equipped with a portfolio of third-party managed cards, in addition to self-issued cards, that are stored in card store 54. Accordingly, there may be no need to make the iButton user device 12 available to the identity selector, if adequate user identities are available in card store 54.

However, the user identities stored on the iButton user device 12 may be required when the user is attempting an internet interaction at a facility other than the user's local machine, e.g., a public computer or other alien terminal. For example, when the user accesses a kiosk machine, the installed identity selector does not have any cards because the kiosk machine does not store a user's information cards. Even a user's local computer, if configured as a thin-client machine, may not contain information cards in the identity selector.

Aware of this deficit of information cards in the identity selector of the access terminal, the user plugs in the iButton user device 12 to host computing system 14 (step 104). Still, the user may opt to plug in the iButton user device 12 even when information cards are provided by the identity selector, in order to increase the range of user identities to choose from. Nevertheless, the invention is most advantageous in the typical kiosk situation where no information cards are available. Insertion of the Java-powered iButton into the kiosk machine is typically preceded by user selection of a Java Card mode, to enable the machine to recognize the iButton external device.

The iButton agent 56 in the identity selector recognizes the iButton and asks the user for the PIN to read the information cards from iButton. The use of PIN protection is optional, but it adds a level of security to the iButton in case the device is lost. Upon gaining access to the iButton with the PIN, the identity selector retrieves the information cards stored in the information card storage 24 of user device 12 (step 106). A basic import/export transaction can be used to retrieve the information cards from the user device.

Figure 5:
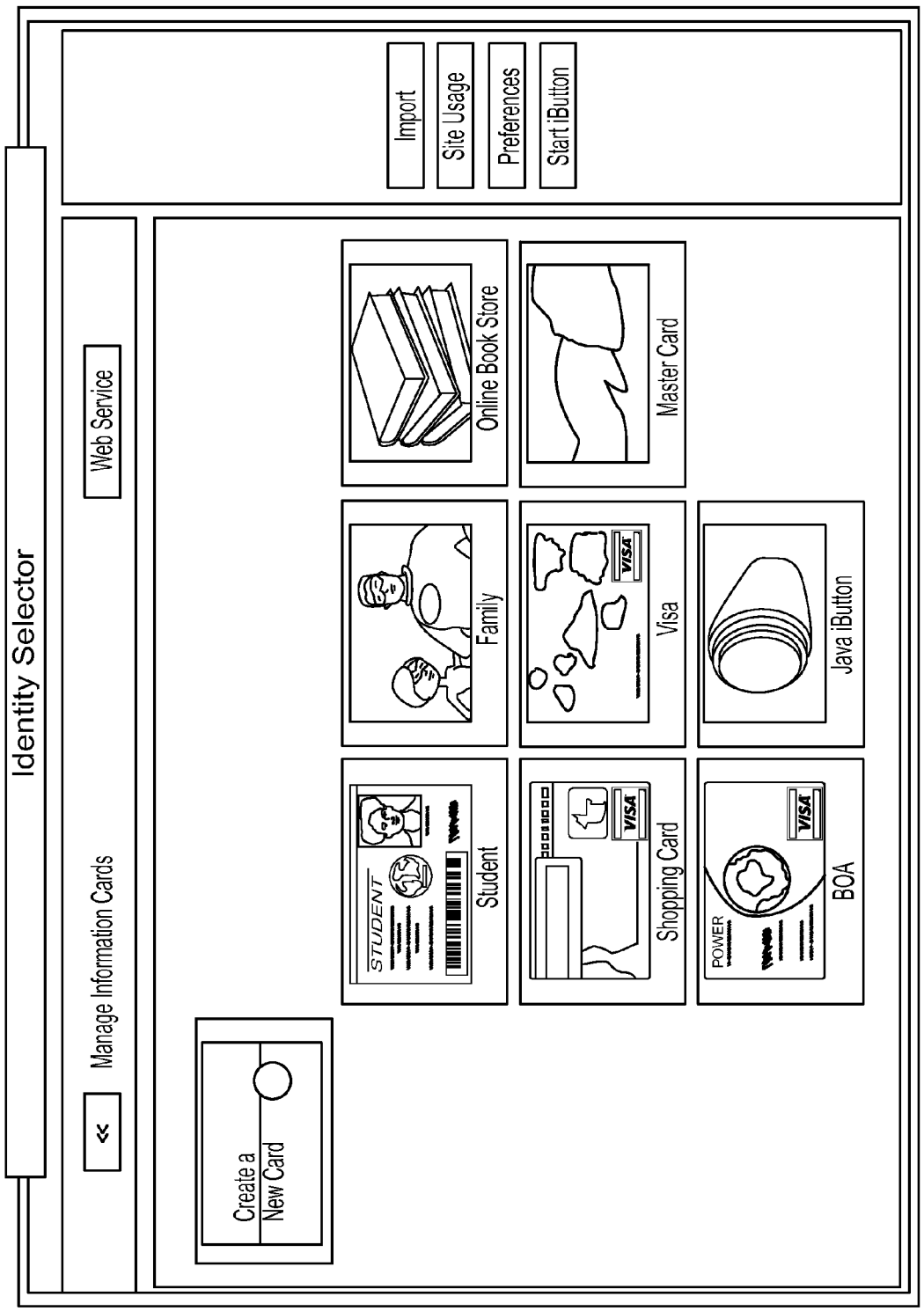
FIG. 5 is a GUI screen showing an illustrative presentation of information cards relating to the operations of FIG. 3.

The identity selector processes the information cards exported from the user device, and determines which ones satisfy the security policy, i.e., that furnish the necessary set of claims to meet the identity requirements (step 108). The identity selector then displays the information cards that are determined to satisfy the security policy (step 110). FIG. 5 is an exemplary GUI screen shot showing the presentation of information cards available for selection by the user. The user then selects one of the information cards that are presented (step 112).

The identity selector generates a token request based on the user identity corresponding to the selected information card (step 114). The token request is forwarded to the iButton user device 12. In turn, the user device 12 issues a security token in response to the token request, and forwards the security token to the identity selector (step 116).

The identity selector, if needed, transforms the security token issued by the iButton user device into a CardSpace compatible security token using the local STS module 60. As an added layer of protection, the identity selector displays the user attribute information conveyed by the security token. In this manner, the user is given an opportunity to make a decision about whether to proceed with the authentication process, namely, to disclose such attribute information to the relying party. If the user consents to the release of the security token, the identity selector presents the security token to the relying party in a conventional manner (step 118).

At the relying party end, the relying party verifies the security token as part of the authentication process. The relying party can then render an authorization decision based on the outcome of the authentication process using the security token. If authorization is approved, then the user is granted access to the requested web service or resource.

Figure 6:
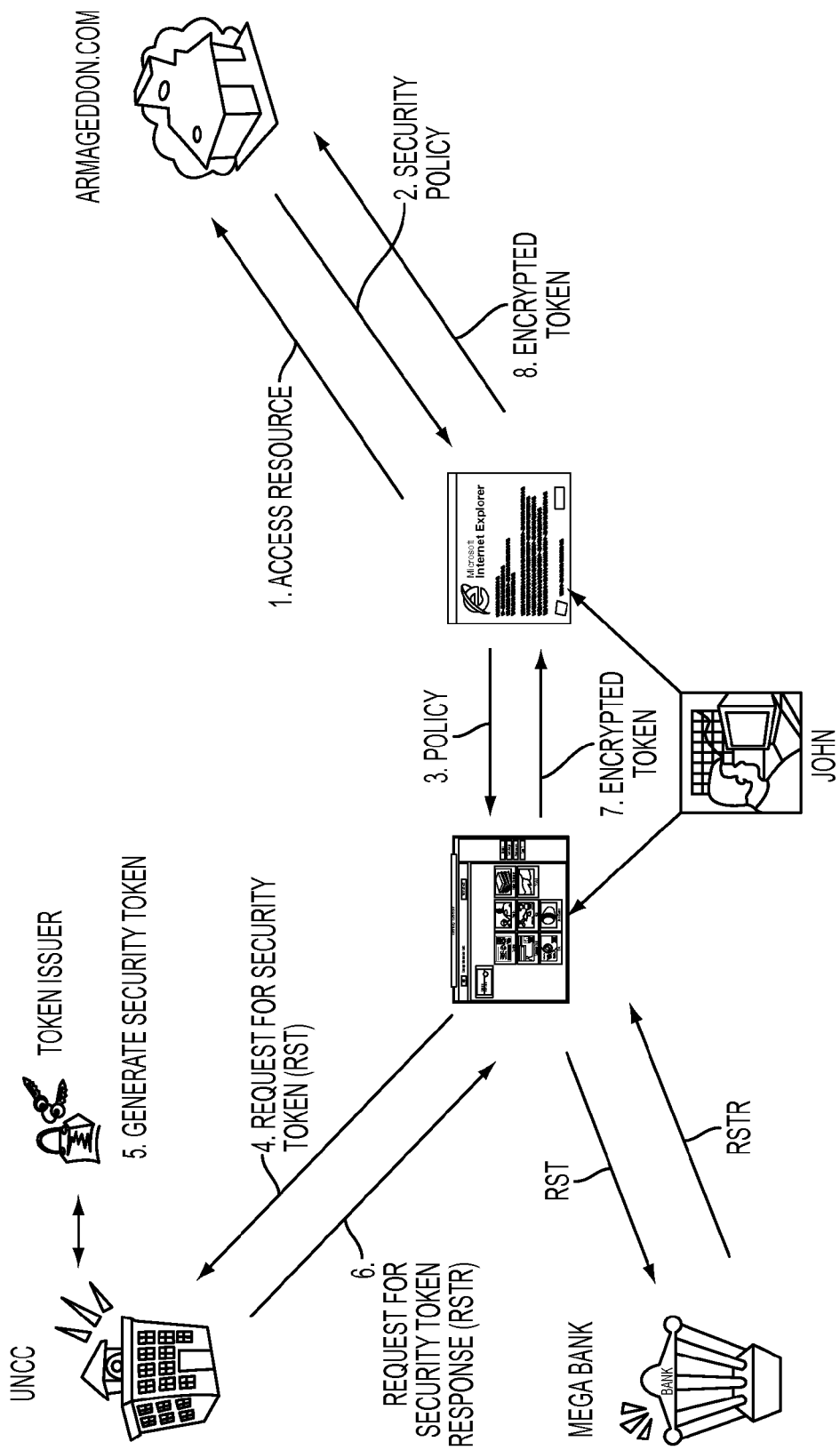
FIGS. 6-7 are pictorial diagrams illustrating the protocol for the identity selector to obtain a security token from an identity provider, in an optional mode.
Figure 7:
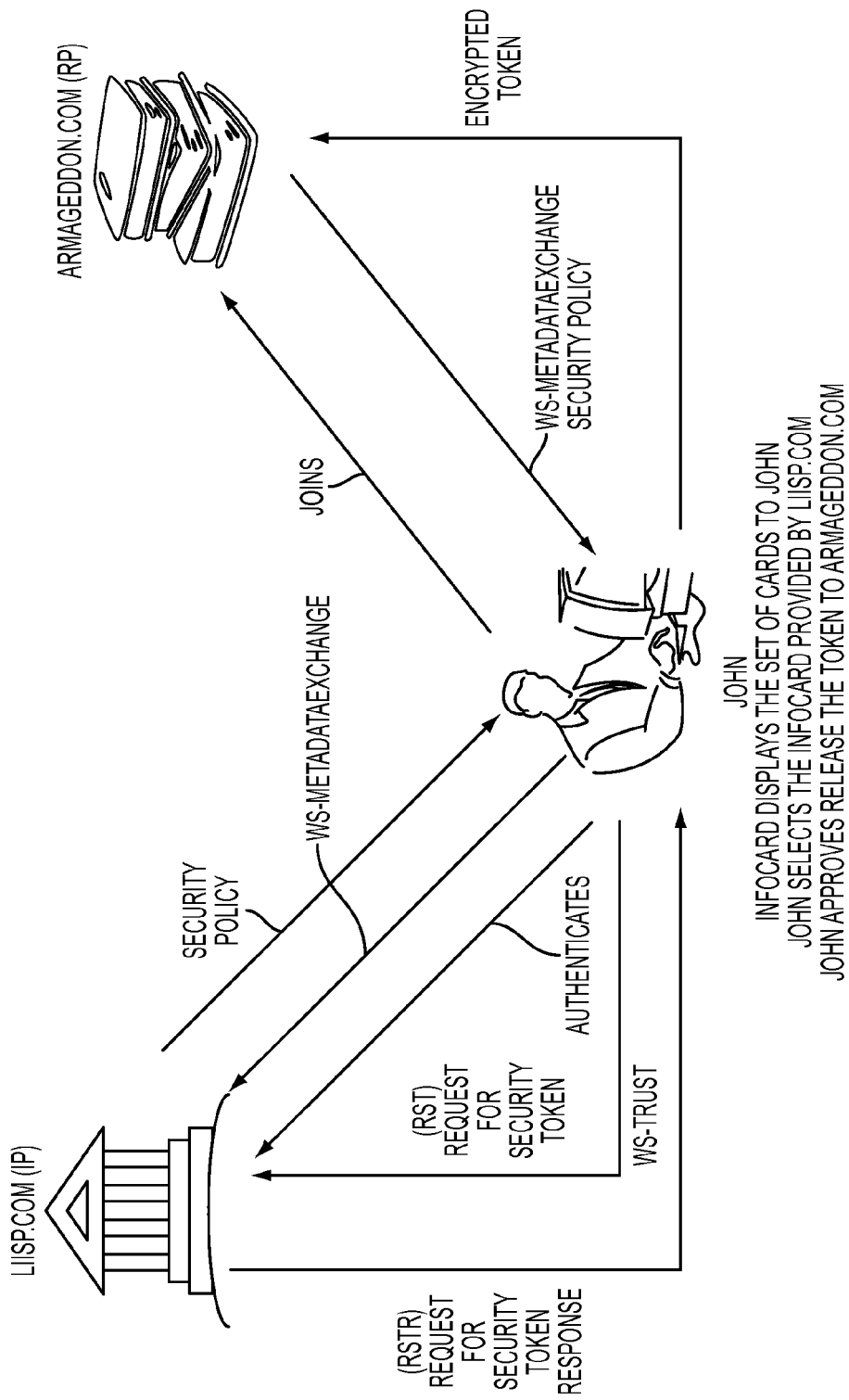

Optionally, in order to provide a comprehensive array of information cards, the identity selector can be configured so that the card store 54 includes third-party managed cards. This portfolio can then be combined with the portfolio of information cards retrieved from the iButton user device. The identity selector now has a broader range of information cards from which to examine and render a determination as to what cards meet the requirements of the security policy. In the event that the user selects an information card provided by the identity selector (i.e., stored in card store 54), the identity selector will be able to generate the appropriate token request. This time, however, the token request will navigate a conventional protocol to invoke the issuance of a security token. Specifically, the token request will be forwarded to the appropriate identity provider located apart from the host computing system. FIGS. 6-7 provide an illustrative scenario depicting the protocol mechanisms employed by the identity selector to obtain a security token concerning a third-party managed card furnished by the identity selector, not the iButton user device. FIGS. 8A-C show in tabular form the specifications for the interaction shown in FIGS. 6-7.

The invention offers several advantages, particularly in relation to the portability features concerning the information cards and security token service.

The user identities are provided in the form of information cards carried on the user device. Significantly, in the invention, the information cards are co-located with the user attribute information that is referenced or otherwise linked to the information cards. For example, information cards typically contain meta data that specifies the types of claims pertaining to a certain identity. In the portable user device of the invention, the user attributes for composing the claim assertions are found on the same platform as the information cards to which the attributes are linked.

By way of review, information cards can be categorized as self-issued cards and managed cards. Typically, in conventional forms, these two types of information cards do not contain personally identifiable information (PII). Rather, the information card generally contains the card name, card image, a list of claims, and issuer information.

There are differences between the two types of cards. In the case of the self-issued card, after the user provides the general-type user's information—such as last name, first name, and email address—the Identity Selector grants the user a self-issued card. The self-issued card, in conventional forms, is stored in the local machine. Although the self-issued card includes general PII, it typically does not include sensitive user information such as social security number, bank account, and credit card number.

The managed card, by comparison, is typically obtained by the user from identity providers such as employers, financial institutions, and the government. Like the self-issued information card, the managed card is conventionally stored in local machines, although the PII associated with the card is not stored in the local machine. Rather, the PII pertaining to conventional managed cards is stored and managed by each identity provider. The managed card enables the identity providers to issue their own set of claims. For example, credit card companies can design a set of claims such as card name, card number, and expiration date in their manage card, while a DMV can design a set of claims such as driver license number, license class, and expiration date in their managed card.

Compared to the organization and implementation of conventional managed cards, the user computing device of the invention provides significant advantages. Because the user device stores user attributes that are available to the onboard security token service installed on the same platform, the user device in effect functions as a user-portable identity provider, since the user device can respond to a token request and issue the security token in an independent fashion. The invention eliminates the need for the identity selector to interact with an identity provider to request and receive a security token, insofar as the user identity and user attributes needed to comply with the relying party's security policy are available on the user device.

The portable security token service is an improvement over conventional authentication protocols that require transactions with a remote identity provider to enlist the issuance of a security token.

Generally, when digital identities are transmitted on a network, such as the internet, the digital identity is typically presented by some form of security token, such as an X.509 certificate, Kerberos ticket, and SAML assertion. In conventional arrangements, the Identity Metasystem generates a security token by contacting the Security Token Service (STS) in the identity provider. When the Identity Selector sends a "RequestSecurityToken" message to the identity provider, the STS in the identity provider responds back with a "RequestSecurityTokenResponse" message that contains a new security token. Accordingly, in conventional systems where managed cards are employed, the Identity Metasystem requires a dedicated STS for each identity provider that supports a managed card. The STS located at each third party identity provider generates security tokens for the managed card. In conventional forms, any STS in the identity selector at the user's local machine is limited to generating security tokens only for self-issued cards.

The invention avoids the need to contact individual identity providers any time a managed card is selected for use during an authentication operation. Once the user selects a managed card exported from the information card database stored on the user device, the host computing system forwards a token request to the user device in reference to the selected managed card. In turn, the user device issues a security token according to the token request. In this manner, the entire sequence of operations supporting the issuance of a security token remains localized to the environment of the host system and the user device, specifically the user device. Since the user device conducts all of the operations to issue a security token, there is no need to contact the identity provider of the managed card to accomplish the same purpose.

A further advantage of the invention relates to the use of Java technology to deploy the portable user device.

In the Java-based implementation of the user computing device, the user device is deployed as a Java Card, which is a Smart Card running a small Java-based operating system. The Java Card is especially useful in this personal security configuration. It can be used to add authentication and secure access to information systems that require a high level of security. Accordingly, as in the invention, the user can carry around valuable and sensitive personal information such as medical history, credit card numbers, and private key in the Java Card.

The Java Card technology enables Smart Cards and other devices with limited memory to run small applications (applets) and provides Smart Card implementations with a secure and interoperable execution platform that can store and update multiple applications on a single device.

Referring to the iButton configuration of the Java Card, the Java-powered iButton is based on Java Card technology and provides, for example, such processing features as a high-speed 1024-bit RSA encryption, non-volatile RAM (NVRAM) capacity, and unalterable realtime clock. It utilizes NVRAM for program and data storage. Unlike electrically erasable programmable read-only memory, the NVRAM iButton memory can be erased and rewritten as often as necessary without wearing out. Therefore, multiple applets can co-exist in NVRAM and control the sensitive data in a secure way.

As a portable item, the iButton can be attached to accessories such as a key fob, wallet, watch, necklace, and finger ring, so that users can carry the iButton conveniently with their ordinary accessories.

Further, the invention is broadly applicable to processing any type of digital identity needed to comply with requirements of online interactions, not simply transactions involving requests for access to web resources.

As used herein, user identity or digital identity should be understood, in one form, to encompass any data or information pertaining to a user. For example, a user's digital identity can be considered as the global set of attributes that make up an online representation of who and what an entity is. It can include access credentials, personal attributes, and personal references. Over the Internet, a user has numerous access credentials that are issued from different sites, and the user also has different or duplicated personal attributes and references on each site.

In each site, a user can be represented by subsets of these attributes. Depending on the situation and the context, different subsets of attributes are used to represent the same user in the Internet. For example, in an auction site, a subset of a user's attributes such as username, password, shopping history, and reputation record represent the user's identity in this site, while a subset of the user's attributes such as a student ID number, class record, and GPA may represent the user's identity in another site.

In terms of developing digital modes of identification, an analogy can be made to physical forms of identification. People carry identity cards such as a driver's license card, a student ID card, and an employee ID card in their wallet. Each identity card can be used in its appropriate context as needed. Like the identity cards in the real world, the digital identity should be carried by the users and it should be used without the limitation of locations and devices. Indeed, people do not use the Internet from only one place via one computer. Rather, people access the Internet from different sites such as home, office, school, and public sites like an Internet cafe. Therefore, the digital identity should be carried safely and it must be interoperable.

The user computing device of the invention provides this portability for the user's identity information. In particular, the information cards stored on the user computing device bear multiple, individual user identities—a digital "wallet"—that can be accessed by the identity selector and subsequently used to facilitate authentication.

The portability aspect of the invention provides various advantages. This portability is featured both with respect to the security token service and to the information cards. The user device includes a storage for providing user identities in the form of information cards. Hence, the user identities are portable. The user device also includes a security token service configured to issue a security token with respect to any of the user identities stored on the user device. For this purpose, the onboard security token service is configured for access to a database of user attributes also stored on the user device. As a result, the user device serves in a standalone manner capable of locally processing token requests received from an external host and issuing security tokens, all without the benefit of any intervening communication with an external identity provider. The onboard security token service in effect functions as an identity provider, rendering the user device a portable identity provider environment capable of performing the role of multiple identity providers, since the security token service is adapted to issue security tokens with respect to any of the managed identities stored on the user device.

A further advantage of the invention is in evidence from an examination of FIGS. 9A-C, which depict various different configurations in FIGS. 9A-B compared to that shown in FIG. 9C adopted by the invention.

The CardSpace stores the information cards in a local machine and provides basic import and export functions for information cards in Identity Selector to present the same identity to service providers from different machines. Using these functions, the users can export their information cards to portable storage devices such as portable USB flash drive, mobile phone, and PDAs, and import the information cards into other machines.

When the information cards are exported, the information cards are encrypted using a key derived from a user-selected pass-phrase to guard against attack. Hence, if a user loses a portable storage device with the exported information cards, other people can decrypt the exported information cards unless they know the pass-phrase of the information cards.

However, these export and import functions are not sufficient to support the various practical scenarios. For example, a user carries the exported information cards in a USB flash driver and imports the information cards in a kiosk machine from the USB flash driver. After using the information cards in the kiosk machine, if the user forgets to delete the imported information cards, then the next user of the kiosk machine can access the previous users' information cards without any restrictions. It is necessary to enable the users to carry the information cards in a secure manner.

Referring now to FIGS. 9A-B, the model of FIG. 9A is similar to the architecture of the Identity Metasystem. The STS is located in the identity provider and the users carry their information cards using portable secure devices. By storing the information cards is portable secure devices, only a user who knows the PIN number of the secure device can access the information cards and is able to export their information cards to multiple machines.

When the user removes the secure device from a machine, the imported information cards should be removed from the machine automatically.

Referring to FIG. 9B, this model shifts the role of identity provider to the portable secure device. The user's attributes and STS are located in a portable secure device and the information cards are located in a local machine. The user carries the STS and attributes in portable secure devices, so the identity selector does not have to contact the identity provider to get a secure token. The identity selector directly contacts the STS in the portable secure device and gets the security token.

This model can be applied to the one-time credit number system. A credit card company issues a portable secure device with STS to the customers. The customers can treat the portable secure device with STS as a portable identity provider. When a customer does an online purchase, the identity selector can get a secure token from the STS in the portable secure device directly. The issued secure token includes the one-time credit card number so the user can protect the real credit card number, and the shopping site cannot know your real credit card number. The drawback is that the information cards are still in local machine. Significant expense is also incurred to distribute the portable STS devices.

Referring to FIG. 9C, this model enables the user to carry the information cards, STS and attributes in a portable secure device, and serves as the basis for the implementation of user device 12. The users are able to directly manage their identities. When a user plugs a portable secure device (PSD) into a machine, and provides the PIN number of the PSD, the identity selector imports and shows the information cards to the user. Once the user selects a managed information card, this selection causes a token to be requested from the STS in the portable secure device. The identity selector receives the issued security token from the STS of the portable secure device. The user can carry the information cards, portable STS and attributes in an integrated manner in a single secure device, giving the user increased flexibility and extensibility to manage digital identities.

Various implementation scenarios are possible with certain components of the identity selector 26 and user device 12.

Figure 10:
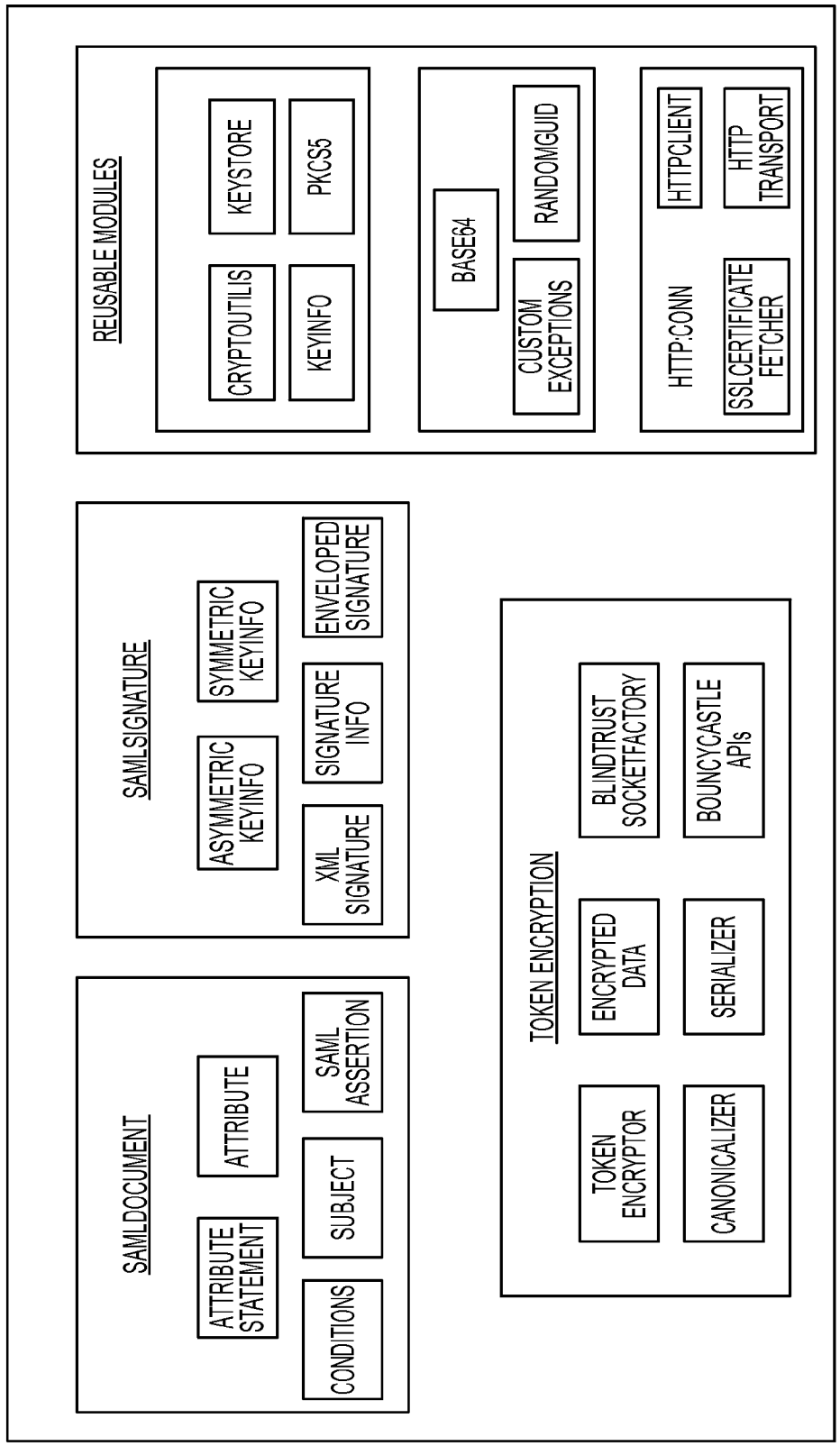
FIG. 10 is a block diagram illustration of one arrangement for the token issuer submodule 60 of identity selector 26 in FIG. 1.

For example, FIG. 10 is a block diagram illustration of one implementation of the token issuer submodule 60 of identity selector 26. The SAML Document and SAML Signature modules can be implemented with OpenSAML 2.0. Some exemplary requirements of the token issuer include OpenSAML 1.1, Apache XML Security, Java Security API's, and Apache Commons HttpClient.

Referring to the portable security token service 20 of user device 12, STS 20 in one form generates a CardSpace compatible security token. The security token service can be implemented in different modes to support the generation of CardSpace compatible security tokens and assist in the portability of information cards. These modes are the basic mode, non-auditing mode, and auditing mode.

According to the basic mode, the PSTS in Java Card generates its own token and the local STS in identity selector transforms the issued token to the CardSpace compatible security token. The local STS signs and encrypts the token for the relying party once the transformation is completed in identity selector. This PSTS approach is thus only available for self-issued cards.

According to the non-auditing mode, the PSTS in Java Card generates a SAML assertion and then the local STS in identity selector encrypts it for the relying party. This is a "non-auditing" mode of Identity Metasystem, as the identity provider has no knowledge of the relying party to protect the user's privacy for Internet activities. Namely, when the identity selector receives a signed token from identity provider, PSTS can generate the SAML assertion by using a predefined XML SAML assertion document and dynamically generated assertion data, such as digested value, signature values, and RSA public key value. The identity selector then encrypts the SAML assertion for the relying party. This approach can be applied to both self-issued and managed information cards.

According to the auditing mode, the PSTS in Java Card directly generates CardSpace compatible security token for the relying party under the assumption that Java Card supports the WS-Trust standard with strong cryptographic algorithms. When the PSTS generates the security token, the PSTS knows the identity of the relying party and generates the security token for the relying party directly. This is in "auditing" mode of Identity Metasystem. When the PSTS receives a "RequestSecurityToken" message from the identity selector, the PSTS generates a security token for the relying party and sends it to the identity selector using "RequestSecurityTokenResponse" message. This approach is similar to current .NET Smart Card approach and can be readily implemented provided Java Card supports the WS-Trust standard with strong cryptographic algorithms.

In one form of the invention, the PSTS applet and iButton/SmartCard agent are based on the basic mode. For example, using a predefined protocol, iButton/SmartCard agent requests a token for self-issued card to PSTS applet. The PSTS applet is a PIN protected applet and provides card storage, user attribute storage, and token generation service. The implementation is built with Java Card 2.2.2 Specification.

While this invention has been described as having a preferred methodology and design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system, comprising:
a user-portable user computing device including:
a storage comprising a plurality of first user identities,
a storage comprising at least one user attribute, and
a security token generator operatively coupled to the user attribute storage, wherein the security token generator:
receives a token request in reference to a first user identity of the first user identities from an identity management module executing on a host computing system, the receipt of the token request responsive to a security policy from a relying party,
determines that the first user identity satisfies the security policy from among the plurality of first user identities,
generates a security token in accordance with the token request, using the at least one user attribute,
exports at least one of the plurality of user identities,
receives the token request relative to one of the exported identities, and
issues the security token based on the token request, using user attribute information associated with the user identities, wherein the security token generator retrieves a set of user attributes to support claim assertions of the security token, and wherein the set is associated with a first information card included in a plurality of selectable information cards containing at least the security token and indicative of the first user identity.

2. The system of claim 1, wherein the user computing device is a personal portable security device.

3. The system of claim 1, wherein the user computing device further comprises:
a smart card.

4. The system of claim 1, wherein the plurality of information cards is displayed for a user to view and from which to enter selections.

5. The system of claim 4, wherein the at least one information card comprises:
at least one self-issued card; and
at least one third-party managed card.

6. The system of claim 1, further comprises:
a service provider environment including at least one identity provider and at least one relying party;
the identity management module executing on a host computing system facilitates online interactions between a user and the service provider environment by managing identity requirements of the interactions; and
a network access connection to enable communications between the identity management module and the service provider environment.

7. The system of claim 6, wherein the identity management module executing on a host computing system: (i) receives identity requirements from the service provider environment relating to a service request, (ii) identifies, as an eligible identity, any user identity among the plurality of first user identities that satisfies the identity requirements, (iii) generates a token request in reference to an eligible user identity, (iv) sends the token request to the security token generator of the user computing device, and (v) receives the security token issued by the security token generator in response to the token request.

8. The system of claim 6, wherein the identity management module further:
provides a plurality of second user identities each associated with a respective identity provider;
responsive to a security policy from a relying party, determines whether any user identity satisfies the security policy from among the plurality of first user identities and the plurality of second user identities,
enables the user to make a selection from among the user identities determined to satisfy the security policy,
responsive to a user selection drawn from the plurality of first user identities, provides a token request based on the selected user identity, communicates the token request to the security token generator of the user computing device, and receives the security token generated thereby, and
responsive to a user selection drawn from the plurality of second user identifies, provides a token request based on the selected user identity, communicates the token request to the identity provider associated with the selected user identity, and receives any security token issued by the identity provider occurring in response to the token request.

9. In an environment including a service provider environment, an identity provider environment, a host computing system, a network connecting the host computing system to the service provider environment and the identity provider environment, and a user-portable user computing device that communicates with the host computing system and including a plurality of first user identities and at least one user attribute, a method, comprising:
the host computing system generating a token request in reference to a first user identity of the first user identities based on an identity management module executing on the host computing system, responsive to a security policy from a relying party, determining that the first user identity satisfies the security policy from among the plurality of first user identities;
the host computing system exporting at least one user identity
the user computing device receiving the token request relative to one of the exported identities; and
the user computing device issuing a security token according to the token request and the user attribute information associated with the user identities;
wherein a security token generator retrieves a set of user attributes to support claim assertions of the security token, and wherein the set is associated with a first information card included in a plurality of selectable information cards containing at least the security token and indicative of the first user identity.

10. The method of claim 9, further comprises:
the user computing device exporting at least one of the first user identities to the host computing system;
the host computing system presenting at least one of the exported user identities to the user;
the user selecting one of the exported user identities;
the host computing system generating further includes generating a token request based on the selected user identity; and
the host computing system communicating the token request to the user computing device.

11. The method of claim 10, further comprises:
the user computing device communicating the security token issued in response to the token request to the host computing system; and
the host computing system presenting the security token to the service provider environment in connection with an identification operation.

12. The method of claim 10, further comprises:
the host computing system receiving from the service provider environment a security policy having requirements, the security policy communicated in connection with a request for service;
the host computing system determining whether any of the first user identities satisfies the requirements of the security policy; and
the host computing system presenting further includes presenting only any first user identities determined to satisfy the requirements of the security policy.

13. The method of claim 9, further comprises:
the user computing device exporting at least one user identity to the host computing system, in response to an import request from the host computing system; and
the host computing system generating further includes generating a token request using one of the exported identities.

14. The method of claim 9, further comprises:
the host computing system receiving from the service provider environment a security policy having requirements, the security policy communicated in connection with a request for service;

the host computing system determining whether any of the first user identities satisfies the requirements of the security policy; and the host computing system generating further includes generating a token relative to a user-selectable one of the first user identities determined to satisfy the requirements of the security policy.

15. The method of claim 9, further comprises:

the host computing system receiving from the service provider environment a security policy having requirements, the security policy communicated in connection with a request for service;

the host computing system providing a plurality of second user identities each associated with a respective identity provider in the identity provider environment;

determining whether any of the first user identities and the second user identities satisfies the security policy requirements;

the user selecting one of the user identities determined to satisfy the security policy requirements;

upon a user selection drawn from the first user identities, the host computing system generating a token request based on the selected user identity, communicating the token request to the user computing device, and receiving the security token generated thereby; and upon a user selection drawn from the second user identities, the host computing system generating a token request based on the selected user identity, communicating the token request to the identity provider associated with the selected user identity, and receiving any security token issued by the identity provider occurring in response to the token request.

16. A non-transitory computer-readable medium having computer-executable instructions for execution by a processor, that, when executed, cause the processor to:

receive a token request in reference to one of a plurality of user identities, the plurality of user identities located on the medium, the token request received from an identity management module executing on a host computing system, the receipt of the token request based on the identity management module, responsive to a security policy of a relying party, determining that the one of the plurality of user identities satisfies the security policy from among the plurality of user identities;

generate a security token in accordance with the token request;

export at least one of the plurality of user identities;

receive the token request relative to one of the exported identities; and issue the security token based on the token request, using user attribute information associated with the at least one of the plurality of user identities;

wherein a security token generator located on the medium retrieves a set of user attributes to support claim assertions of the security token, and wherein the set is associated with a first information card included in a plurality of selectable information cards containing at least the security token and indicative of the first user identity.

17. The non-transitory computer-readable medium of claim 16, wherein the instructions further cause the processor to:

associate each user identity with at least one user attribute located on the medium; and generate the security token using any user attribute associated with the user identity referenced by the token request.

18. The non-transitory computer-readable medium of claim 16, wherein the instructions further cause the processor to:

receive a determination specifying whether any of the user identities satisfies requirements of a security policy; and export any user identity determined to satisfy requirements of the security policy.

19. The non-transitory computer-readable medium of claim 18, wherein the instructions further cause the processor to:

receive a token request made in connection with user selection of one of the exported user identities; and generate a security token in accordance with the token request relating to the user identity selection.

\* \* \* \* \*